United States Patent
Kwon et al.

(10) Patent No.: US 8,748,032 B2
(45) Date of Patent: Jun. 10, 2014

(54) CABLE-TYPE SECONDARY BATTERY

(75) Inventors: Yo-Han Kwon, Daejeon (KR);
Je-Young Kim, Daejeon (KR); Ki-Tae Kim, Daejeon (KR); Heon-Cheol Shin, Busan (KR); Hyung-Man Cho, Busan (KR); Hye-Ran Jung, Busan (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/344,980

(22) Filed: Jan. 6, 2012

(65) Prior Publication Data

US 2012/0107658 A1    May 3, 2012

Related U.S. Application Data

(63) Continuation of application No. PCT/KR2011/004138, filed on Jun. 7, 2011.

(30) Foreign Application Priority Data

Aug. 27, 2010 (KR) ........................ 10-2010-0083637

(51) Int. Cl.
*H01M 2/02* (2006.01)

(52) U.S. Cl.
USPC ............ 429/169; 429/164; 429/135; 429/146

(58) Field of Classification Search
USPC ................................. 429/169, 164, 135, 146
See application file for complete search history.

(56) References Cited

U.S. PATENT DOCUMENTS

| | | | |
|---|---|---|---|
| 3,607,401 A | 9/1971 | Halpert et al. | |
| 6,210,827 B1 | 4/2001 | Dopp et al. | |
| 2003/0059526 A1 | 3/2003 | Benson et al. | |
| 2003/0064292 A1 | 4/2003 | Neudecker et al. | |
| 2003/0162086 A1 | 8/2003 | Longhi, Jr. et al. | |
| 2007/0048610 A1* | 3/2007 | Tsang | 429/218.1 |
| 2010/0203372 A1 | 8/2010 | Kim et al. | |
| 2010/0243964 A1* | 9/2010 | Lee et al. | 252/503 |
| 2011/0104539 A1* | 5/2011 | Oh et al. | 429/94 |

FOREIGN PATENT DOCUMENTS

| | | |
|---|---|---|
| JP | 9-283149 A | 10/1997 |
| JP | 11-265730 A | 9/1999 |
| JP | 2001-110445 A | 4/2001 |
| JP | 2002-157997 A | 5/2002 |
| JP | 2003-92145 A | 3/2003 |
| KR | 10-0742739 B1 | 7/2007 |
| KR | 10-0804411 B1 | 2/2008 |
| KR | 10-2009-0009598 A | 1/2009 |
| WO | WO 2005098994 A1 * | 10/2005 |

* cited by examiner

*Primary Examiner* — Jane Rhee
(74) *Attorney, Agent, or Firm* — Birch, Stewart, Kolasch & Birch, LLP

(57) ABSTRACT

Provided is a cable-type secondary battery including an anode current collector having a horizontal cross section of a predetermined shape and extending longitudinally, an anode active material pattern layer having anode active material patterns spaced away at a predetermined interval on the anode current collector, an electrolyte layer surrounding the anode active material pattern layer and serving as an ion channel, a cathode active material pattern layer having cathode active material patterns spaced away at a predetermined interval on the electrolyte layer at locations corresponding to those of the anode active material patterns, and a cathode current collector surrounding the cathode active material pattern layer.
The cable-type secondary battery having the active material patterns has excellent flexibility to prevent the active material from falling off from the active material layer.

13 Claims, 2 Drawing Sheets

CABLE-TYPE SECONDARY BATTERY

CROSS-REFERENCE TO RELATED APPLICATION(S)

This application is a continuation of International Application PCT/KR2011/004138 filed on Jun. 7, 2011, which claims priority to Korean Patent Application No. 10-2010-0083637 filed in the Republic of Korea on Aug. 27, 2010, the entire contents of which are incorporated herein by reference.

BACKGROUND

1. Technical Field

The present invention relates to a cable-type secondary battery of free shape adaptation.

2. Background Art

Secondary batteries are devices capable of storing energy in chemical form and of converting into electrical energy to generate electricity when needed. The secondary batteries are also referred to as rechargeable batteries because they can be recharged repeatedly. Common secondary batteries include lead accumulators, NiCd batteries, NiMH accumulators, Li-ion batteries, Li-ion polymer batteries, and the like. When compared with disposable primary batteries, not only are the secondary batteries more economically efficient, they are also more environmentally friendly.

Secondary batteries are currently used in applications requiring low electric power, for example, equipment to help the start-up of vehicles, mobile devices, tools, uninterruptible power supplies, and the like. Recently, as the development of wireless communication technologies has been leading to the popularization of mobile devices and even to the mobilization of many kinds of conventional devices, the demand for secondary batteries has been dramatically increasing. Secondary batteries are also used in environmentally friendly next-generation vehicles such as hybrid vehicles and electric vehicles to reduce the costs and weight and to increase the service life of the vehicles.

Generally, secondary batteries have a cylindrical, prismatic, or pouch shape. This is associated with a fabrication process of the secondary batteries in which an electrode assembly composed of an anode, a cathode, and a separator is mounted in a cylindrical or prismatic metal casing or a pouch-shaped casing of an aluminum laminate sheet, and in which the casing is filled with electrolyte. Because a predetermined mounting space for the electrode assembly is necessary in this process, the cylindrical, prismatic or pouch shape of the secondary batteries is a limitation in developing various shapes of mobile devices. Accordingly, there is a need for secondary batteries of a new structure that are easily adaptable in shape.

To fulfill this need, suggestions have been made to develop linear batteries having a very high ratio of length to cross-sectional diameter. Korean Patent No. 0804411 discloses a linear battery comprising a plurality of anodes and a plurality of cathodes with separators interposed therebetween. Korean Patent Registration No. 0742739 discloses a thread-type flexible battery including cathode threads and anode threads, however this is not easily adaptable in shape. Also, when a cable-type secondary battery is deformed by an excessive external force, an active material may fall off from an active material layer.

DISCLOSURE

Technical Problem

It is an object of the present invention to provide a secondary battery of a new linear structure that is easily adaptable in shape to maintain stability and excellent performance.

Technical Solution

A cable-type secondary battery of the present invention may include an anode current collector having a horizontal cross section of a predetermined shape and extending longitudinally, an anode active material pattern layer having anode active material patterns spaced away at a predetermined interval on the anode current collector, an electrolyte layer surrounding the anode active material pattern layer and serving as an ion channel, a cathode active material pattern layer having cathode active material patterns spaced away at a predetermined interval on the electrolyte layer at locations corresponding to those of the anode active material patterns, and a cathode current collector surrounding the cathode active material pattern layer.

The cathode current collector may be a pipe-type current collector of a predetermined shape, or a mesh-type current collector of a predetermined shape.

Also, the cathode current collector may be a wire-type current collector wound on the cathode active material pattern layer.

In this instance, the current collector is preferably made from stainless steel, aluminum, nickel, titanium, sintered carbon, or copper; stainless steel surface-treated with carbon, nickel, titanium, or silver; aluminum-cadmium alloys; non-conductive polymer surface-treated with a conductive material; or conductive polymers. The conductive material may be any one selected from the group consisting of polyacetylene, polyaniline, polypyrrole, polythiophene, polysulfur nitride, indium thin oxide (ITO), silver, palladium, and nickel, or mixtures thereof, and the conductive polymer may be any one selected from the group consisting of polyacetylene, polyaniline, polypyrrole, polythiophene, and polysulfur nitride, or mixtures thereof.

The anode active material pattern layer may be formed from an active material including an active material particle of any one selected from the group consisting of natural graphite, artificial graphite, or carbonaceous materials; lithium-containing titanium composite oxides (LTOs); metals (Me) including Si, Sn, Li, Zn, Mg, Cd, Ce, Ni, and Fe; alloys of the metals (Me); oxides (MeOx) of the metals (Me); and composites of the metals (Me) and carbon, or mixtures thereof. The cathode active material pattern layer may be formed from an active material including an active material particle of any one selected from the group consisting of $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$, or mixtures (M1 and M2 are each independently any one selected from the group consisting of Al, Ni, Co, Fe, Mn, V, Cr, Ti, W, Ta, Mg, and Mo, and x, y, and z are each independently an atomic fraction of each component in the oxide, where $0 \leq x < 0.5$, $0 \leq y < 0.5$, $0 \leq z < 0.5$, $x+y+z \leq 1$).

The electrolyte layer may be formed from an electrolyte selected from the group consisting of a gel polymer electrolyte of polyethylene oxide (PEO), polyvinylidene fluoride (PVdF), polymethylmethacrylate (PMMA), polyacrylonitrile (PAN), or polyvinylacetate (PVAc); and a solid polymer electrolyte of PEO, polypropylene oxide (PPO), polyethylene imine (PEI), polyethylene sulphide (PES), or PVAc.

In the cable-type secondary battery of the present invention, the electrolyte layer may further include a lithium salt. The lithium salt may be any one selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chlorine borane lithium, aliphatic lower lithium carbonate, and tetra phenyl lithium borate, or mixtures thereof.

Advantageous Effect

The cable-type secondary battery of the present invention has an active material pattern layer in which a non-patterned part has relatively higher flexibility than a patterned part, thereby improving the flexibility of the entire cable-type secondary battery.

Also, when an excessive external force is applied to the cable-type secondary battery of the present invention, the non-pattern part of the active material pattern layer deforms earlier than the patterned part, thereby preventing the active material layer from deforming and consequently the active material from falling off from the active material layer.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
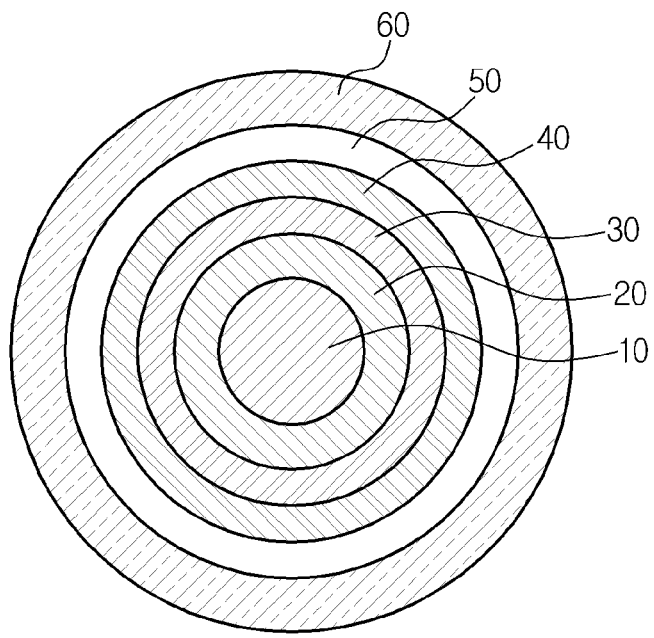
FIG. 1 is a cross-sectional view of a cable-type secondary battery according to an embodiment of the present invention.
Figure 2:
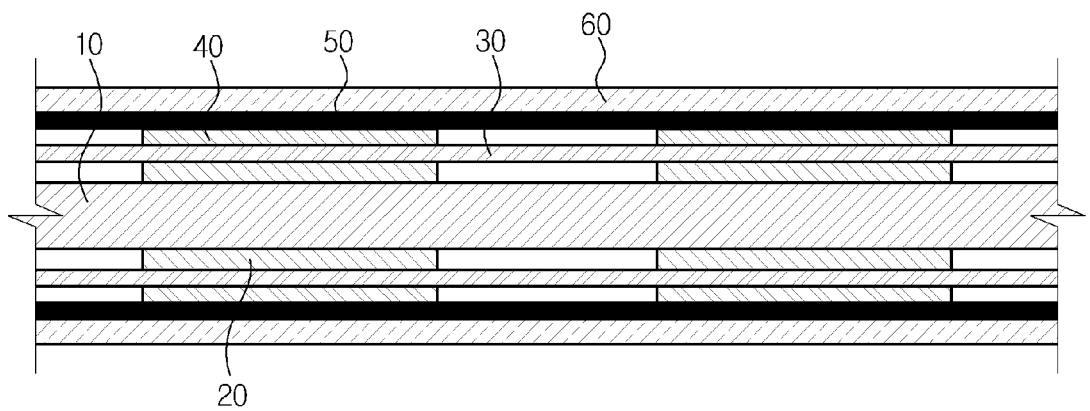
FIG. 2 is a cross-sectional view of a cable-type secondary battery according to an embodiment of the present invention.

A cable-type secondary battery according to an embodiment of the present invention is schematically illustrated in FIGS. 1 and 2 in which like elements are referred to like reference numerals. Referring to FIGS. 1 and 2, a cable-type secondary battery according to an embodiment of the present invention includes an anode current collector 10 having a horizontal cross section of a predetermined shape and extending longitudinally, an anode active material pattern layer 20 having anode active material patterns spaced away at a predetermined interval on the outer surface of the anode current collector 10, an electrolyte layer 30 surrounding the anode active material pattern layer 20 and serving as an ion channel, a cathode active material pattern layer 40 having cathode active material patterns spaced away at a predetermined interval on the outer surface of the electrolyte layer 30 at locations corresponding to those of the anode active material patterns, and a cathode current collector 50 surrounding the cathode active material pattern layer 40. Here, the predetermined shape is not limited to a specific shape, and may include any shape without departing from the spirit and scope of the present invention. The cable-type secondary battery of the present invention has a horizontal cross section of a predetermined shape and a linear structure extending longitudinally, perpendicular to the horizontal cross section. The cable-type secondary battery has flexibility and consequently free shape adaptation.

The anode active material pattern layer 20 of the present invention has anode active material patterns formed on the outer surface of the anode current collector 10, the anode active material patterns spaced away at a predetermined interval. Here, the predetermined interval is not limited to a specific interval. As shown in FIG. 2, the anode active material patterns are arranged at a predetermined interval therebetween to form the anode active material patterns layer 20. Also, the cathode active material pattern layer 40 has cathode active material patterns spaced away at a predetermined interval therebetween at locations corresponding to those of the anode active material patterns.

The electrode active material layer includes an electrode active material, a binder, and a conductive material, and forms an electrode with the current collector. When the electrode deforms by an external force, particularly the electrode is crushed or broken, the electrode active material may fall off from the electrode active material layer, thereby resulting in reduced performance and capacity of the battery. However, the cable-type secondary battery of the present invention has the anode active material pattern layer 20 and the cathode active material pattern layer 40 where a non-patterned part deforms earlier than a patterned part when an excessive external force is applied to the cable-type secondary battery of the present invention. This is because the non-patterned part is more flexible than the patterned part, and thus, even though the same force is applied, the non-patterned part deforms earlier than the patterned part. Accordingly, the electrode active material layer of the present invention, the anode active material pattern layer 20 and the cathode active material pattern layer 40 is less subject to deformation, thereby preventing the electrode active material from falling off from the electrode active material layer.

The non-patterned part, where the electrode active material layer is absent, having excellent flexibility, also improves the flexibility of the entire cable-type secondary battery.

The electrode active material pattern layer 20 and 40 of the present invention allow ion migration through the current collector 10 and 50, and ion migration is carried out by intercalation/disintercalation of ions into/from the electrolyte layer 30.

The cathode current collector 50 may be a pipe-type current collector of a predetermined shape. To ensure the flexibility, the cathode current collector 50 may also be a mesh-type current collector of a net-like structure having excellent flexibility.

The cathode current collector 50 may be a wire-type current collector, and a cable-type secondary battery may be fabricated by winding the wire-type current collector on the outer surface of the cathode active material pattern layer 40. In particular, the wire-type current collector may be wound on only the patterned part and not on the non-patterned part, thereby improving the flexibility (see FIG. 3). When the pipe-type cathode current collector is crushed or broken by an external force, the sharpened cathode current collector may contact the anode current collector 20 through the electrolyte layer 30, resulting in a short circuit. However, the wire-type current collector is not easily crushed or broken by an external force, thereby reducing the likelihood of a short circuit caused by the permeation into the electrolyte layer 30.

Preferably, the current collector 10 and 50 is made from stainless steel, aluminum, nickel, titanium, sintered carbon, or copper; stainless steel surface-treated with carbon, nickel, titanium, or silver; aluminum-cadmium alloys; non-conductive polymers surface-treated with a conductive material; or conductive polymers.

The current collector gathers the electrons generated by an electrochemical reaction of the active material, or supplies the electrons required for an electrochemical reaction. Generally, the current collector is made from metal such as copper or aluminum. However, when the current collector is particularly a polymer conductor of a non-conductive polymer surface-treated with a conductive material or of a conductive polymer, flexibility is relatively higher than that of the case where the current collector is made from metal such as copper or aluminum. Also, the polymer-based current collector may achieve weight reduction of the battery when compared with a metal-based current collector.

The conductive material may include polyacetylene, polyaniline, polypyrrole, polythiophene, polysulfur nitride, indium thin oxide (ITO), silver, palladium, and nickel. The conductive polymer may include polyacetylene, polyaniline, polypyrrole, polythiophene, and polysulfur nitride. However, the non-conductive polymer used in the current collector is not limited to a specific type of non-conductive polymer.

The anode active material pattern layer 20 may include, but is not limited to, natural graphite, artificial graphite, or carbonaceous materials; lithium-containing titanium composite oxides (LTOs); metals (Me) such as Si, Sn, Li, Zn, Mg, Cd, Ce, Ni, and Fe; alloys of the metals (Me); oxides (MeOx) of the metals (Me); and composites of the metals (Me) and carbon.

The cathode active material pattern layer 40 may include, but is not limited to, $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$ (M1 and M2 are each independently any one selected from the group consisting of Al, Ni, Co, Fe, Mn, V, Cr, Ti, W, Ta, Mg, and Mo, and x, y, and z are each independently an atomic fraction of each component in the oxide, where $0 \leq x < 0.5$, $0 \leq y < 0.5$, $0 \leq z < 0.5$, $x+y+z \leq 1$).

In the cable-type secondary battery of the present invention, the electrolyte layer 30 surrounding the inner electrode serves as an ion channel, and is formed from a gel polymer electrolyte of polyethylene oxide (PEO), polyvinylidene fluoride (PVdF), polymethylmethacrylate (PMMA), polyacrylonitrile (PAN), or polyvinylacetate (PVAc); or a solid polymer electrolyte of PEO, polypropylene oxide (PPO), polyethylene imine (PEI), polyethylene sulphide (PES), or PVAc. Preferably, a matrix of the solid electrolyte is basically a polymer matrix or a ceramic-glass matrix. Even though a typical polymer electrolyte has sufficient ion conductivity, ions may move slowly, that is, a reaction rate may be low, and thus the gel polymer electrolyte having favorable ion movement is preferred over the solid polymer electrolyte. Because the gel polymer electrolyte has poor mechanical properties, a porous support or a crosslinked polymer may be used to improve the mechanical properties of the gel polymer electrolyte. The electrolyte layer of the present invention may act as a separator, thereby eliminating the use of a separator.

The electrolyte layer 30 of the present invention may further include a lithium salt. The lithium salt may improve ion conductivity and reaction rate, and may include, but is not limited to, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chlorine borane lithium, aliphatic lower lithium carbonate, and tetra phenyl lithium borate.

The present invention has a protection coating 60 formed on the outer surface of the cathode current collector 50, and the protection coating 60 may act as an insulator to protect the electrode from moisture in the air or from external impact. The protection coating 60 may be formed from typical polymer resins, for example, PVC, high-density polyethylene (HDPE), or epoxy resin.

Also, the cable-type secondary battery according to an embodiment of the present invention may include a cathode current collector having a horizontal cross section of a predetermined shape and extending longitudinally, a cathode active material pattern layer having cathode active material patterns spaced away at a predetermined interval on the outer surface of the cathode current collector, an electrolyte layer surrounding the cathode active material pattern layer and serving as an ion channel, an anode active material pattern layer having anode active material patterns spaced away at a predetermined interval on the outer surface of the electrolyte layer at locations corresponding to those of the cathode active material patterns, and an anode current collector surrounding the anode active material pattern layer. The anode current collector may be a pipe-type current collector of a predetermined shape or a mesh-type current collector of a predetermined shape. Also, the anode current collector may be a wire-type current collector wound on the outer surface of the anode active material pattern layer.

Figure 3:
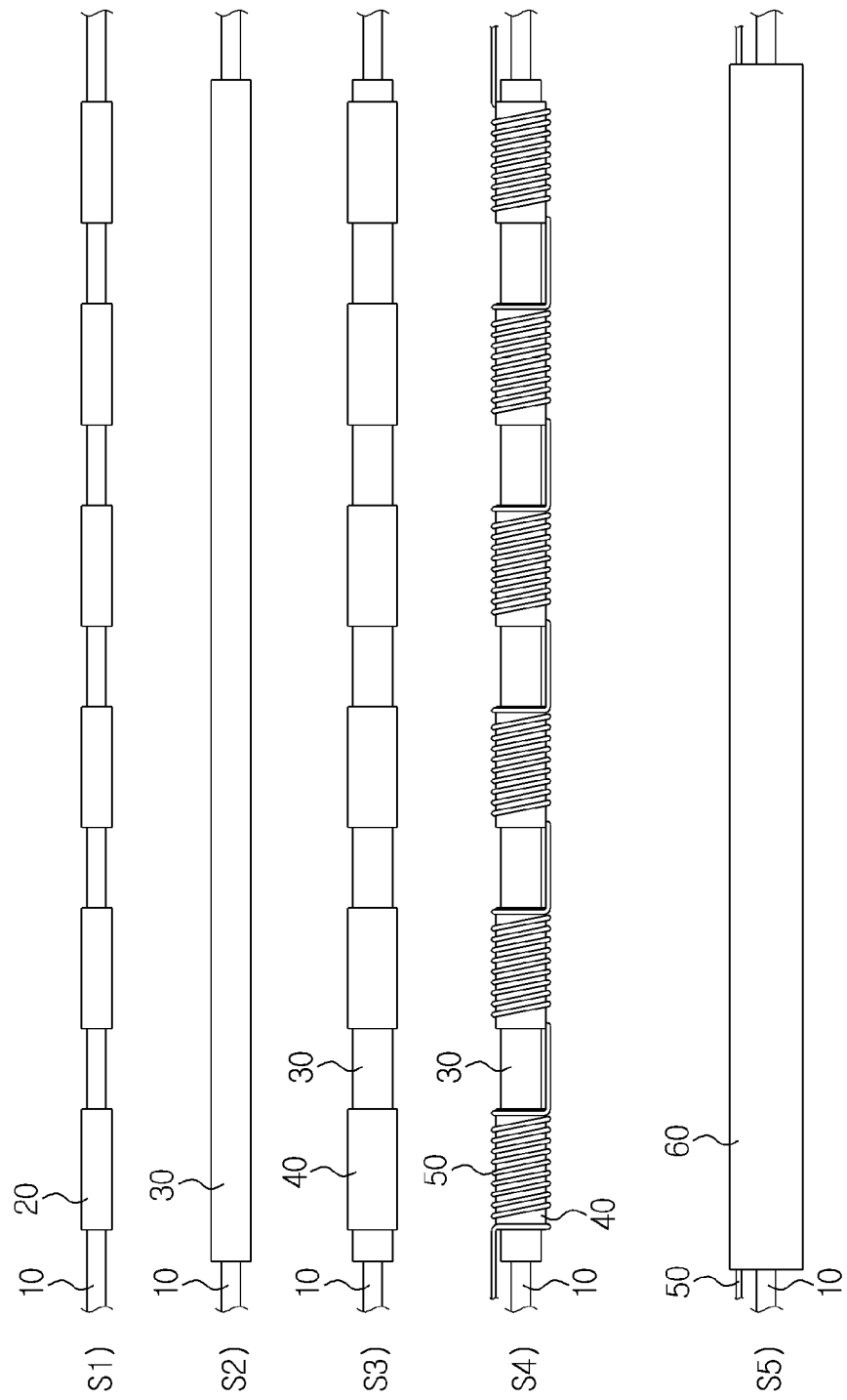
FIG. 3 is a process diagram of a method for fabricating a cable-type secondary battery according to an embodiment of the present invention.

Hereinafter, a method for fabricating the foregoing cable-type secondary battery is briefly described with reference to FIG. 3 below.

In step S1, the wire-type linear anode current collector 10 is prepared and surface-coated with the anode active material pattern layer 20 made up of anode active material patterns spaced away at a predetermined interval. In this instance, a typical coating process may be used, specifically an electroplating process or an anodic oxidation process. To maintain a predetermined interval, it is preferred to discontinuously extrusion-coat an electrode slurry including an active material through an extruder.

In step S2, the anode active material pattern layer 20 is surface-coated with the electrolyte layer 30. In this instance, a process for forming the electrolyte layer 30 is not specially limited, however extrusion-coating is advantageous in fabricating the cable-type linear secondary battery due to the characteristics of the battery.

In step S3, the coated electrolyte layer 30 is surface-coated with the cathode active material pattern layer 40 made up of cathode active material patterns spaced away at the same interval as that of the anode active material patterns. The same coating process as the anode active material pattern layer 20 may be applied to the cathode active material pattern layer 40. Also, for the balance between the cathode active material and the anode active material, the interval of the cathode active material patterns may be adjusted.

In step S4, the wire-type cathode current collector 50 is wound on the outer surface of the cathode active material pattern layer 40. A winding process is not specially limited, however a winding machine may be used to discontinuously wind the wire-type current collector 50 on the outer surface of the cathode active material pattern layer 40 at a predetermined interval.

In step S5, the protection coating 60 is formed on the outer surface of the wire-type current collector 50. The protection coating 60 is formed on the outmost surface and acts as an insulator to protect the electrode from moisture in the air or from external impact. The protection coating 60 may be formed from typical polymer resins, for example, PVC, high-density polyethylene (HDPE), or epoxy resin.

What is claimed is:

1. A cable-type secondary battery comprising:
   an anode current collector having a horizontal cross section of a predetermined shape and extending longitudinally;
   an anode active material pattern layer having anode active material patterns spaced away at a predetermined interval on the anode current collector;
   an electrolyte layer surrounding the anode active material pattern layer and serving as an ion channel;
   a cathode active material pattern layer having cathode active material patterns spaced away at a predetermined interval on the electrolyte layer at locations corresponding to those of the anode active material patterns; and
   a cathode current collector surrounding the cathode active material pattern layer,
   wherein the cathode current collector is a wire-type current collector wound multiple times about the cathode active material pattern layer.

2. The cable-type secondary battery according to claim 1, wherein the anode active material pattern layer is formed from an active material including an active material particle of any one selected from the group consisting of natural graphite, artificial graphite, or carbonaceous materials; lithium-containing titanium composite oxides (LTOs); metals (Me) including Si, Sn, Li, Zn, Mg, Cd, Ce, Ni, and Fe; alloys of the metals (Me); oxides (MeOx) of the metals (Me); and composites of the metals (Me) and carbon, or mixtures thereof.

3. The cable-type secondary battery according to claim 1, wherein the cathode active material pattern layer is formed from an active material including an active material particle of any one selected from the group consisting of $LiCoO_2$, $LiNiO_2$, $LiMn_2O_4$, $LiCoPO_4$, $LiFePO_4$, $LiNiMnCoO_2$, and $LiNi_{1-x-y-z}Co_xM1_yM2_zO_2$, or mixtures (M1 and M2 are each independently any one selected from the group consisting of Al, Ni, Co, Fe, Mn, V, Cr, Ti, W, Ta, Mg, and Mo, and x, y, and z are each independently an atomic fraction of each component in the oxide, where $0 \leq x < 0.5$, $0 \leq y < 0.5$, $0 \leq z < 0.5$, $x+y+z \leq 1$).

4. The cable-type secondary battery according to claim 1, wherein the anode current collector is made from stainless steel, aluminum, nickel, titanium, sintered carbon, or copper; stainless steel surface-treated with carbon, nickel, titanium, or silver; aluminum-cadmium alloys; non-conductive polymer surface-treated with a conductive material; or conductive polymers.

5. The cable-type secondary battery according to claim 1, wherein the cathode current collector is made from stainless steel, aluminum, nickel, titanium, sintered carbon, or copper; stainless steel surface-treated with carbon, nickel, titanium, or silver; aluminum-cadmium alloys; non-conductive polymer surface-treated with a conductive material; or conductive polymers.

6. The cable-type secondary battery according to claim 4, wherein the conductive material is any one selected from the group consisting of polyacetylene, polyaniline, polypyrrole, polythiophene, polysulfur nitride, indium thin oxide (ITO), silver, palladium, and nickel, or mixtures thereof.

7. The cable-type secondary battery according to claim 4, wherein the conductive polymer is any one selected from the group consisting of polyacetylene, polyaniline, polypyrrole, polythiophene, and polysulfur nitride, or mixtures thereof.

8. The cable-type secondary battery according to claim 1, wherein the electrolyte layer is formed from an electrolyte selected from the group consisting of a gel polymer electrolyte of polyethylene oxide (PEO), polyvinylidene fluoride (PVdF), polymethylmethacrylate (PMMA), polyacrylonitrile (PAN), or polyvinylacetate (PVAc); and a solid polymer electrolyte of PEO, polypropylene oxide (PPO), polyethylene imine (PEI), polyethylene sulphide (PES), or PVAc.

9. The cable-type secondary battery according to claim 1, wherein the electrolyte layer further includes a lithium salt.

10. The cable-type secondary battery according to claim 9, wherein the lithium salt is any one selected from the group consisting of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chlorine borane lithium, aliphatic lower lithium carbonate, and tetra phenyl lithium borate, or mixtures thereof.

11. A cable-type secondary battery comprising:
    a cathode current collector having a horizontal cross section of a predetermined shape and extending longitudinally;
    a cathode active material pattern layer having cathode active material patterns spaced away at a predetermined interval on the cathode current collector;
    an electrolyte layer surrounding the cathode active material pattern layer and serving as an ion channel;
    an anode active material pattern layer having anode active material patterns spaced away at a predetermined interval on the electrolyte layer at locations corresponding to those of the cathode active material patterns; and
    an anode current collector surrounding the anode active material pattern layer,
    wherein the anode current collector is a wire-type current collector wound multiple times about the anode active material pattern layer.

12. The cable-type secondary battery according to claim 5, wherein the conductive material is any one selected from the group consisting of polyacetylene, polyaniline, polypyrrole, polythiophene, polysulfur nitride, indium thin oxide (ITO), silver, palladium, and nickel, or mixtures thereof.

13. The cable-type secondary battery according to claim 5, wherein the conductive polymer is any one selected from the group consisting of polyacetylene, polyaniline, polypyrrole, polythiophene, and polysulfur nitride, or mixtures thereof.

* * * * *